(12) United States Patent
Ballou et al.

(10) Patent No.: US 11,198,644 B2
(45) Date of Patent: Dec. 14, 2021

(54) SURFACE CRACK FILLER COMPOUND

(71) Applicant: Logical Resource, Inc., Brea, CA (US)

(72) Inventors: Randy Ballou, Temecula, CA (US); Elden Peterson, Corona, CA (US)

(73) Assignee: Logical Resource, Inc., Brea, CA (US)

( * ) Notice: Subject to any disclaimer, the term of this patent is extended or adjusted under 35 U.S.C. 154(b) by 0 days.

(21) Appl. No.: 16/721,645

(22) Filed: Dec. 19, 2019

(65) Prior Publication Data

US 2020/0231501 A1 Jul. 23, 2020

Related U.S. Application Data

(60) Provisional application No. 62/794,522, filed on Jan. 18, 2019.

(51) Int. Cl.
| | | |
|---|---|---|
| *C04B 28/02* | (2006.01) | |
| *C04B 14/06* | (2006.01) | |
| *C04B 24/26* | (2006.01) | |
| *E04G 23/02* | (2006.01) | |
| *E01C 23/09* | (2006.01) | |
| *C04B 40/00* | (2006.01) | |
| *C04B 28/04* | (2006.01) | |
| *C04B 111/72* | (2006.01) | |

(52) U.S. Cl.
CPC ............. *C04B 28/02* (2013.01); *C04B 14/06* (2013.01); *C04B 24/2623* (2013.01); *C04B 24/2635* (2013.01); *C04B 28/04* (2013.01); *C04B 40/0042* (2013.01); *E01C 23/0973* (2013.01); *E04G 23/0203* (2013.01); *C04B 2111/72* (2013.01)

(58) Field of Classification Search
CPC . C04B 14/06; C04B 24/2623; C04B 24/2635; C04B 28/02; C04B 28/04; C04B 40/0042; C04B 40/0608; C04B 2103/54; C04B 2111/72; C04B 2111/00663; C04B 2111/0075; E01C 11/005; E01C 23/0973; E04G 23/0203

See application file for complete search history.

(56) References Cited

U.S. PATENT DOCUMENTS 7,910,162 B2 † 3/2011 Cogan
9,885,157 B1 * 2/2018 Eliason .................. E01C 5/003

OTHER PUBLICATIONS

Logical Resource, Inc. (Applicant), Magic Crack Filler Safety Data Sheet, Mar. 31, 2016, https://logicalresource.net/wp-content/uploads/2019/04/2019-SDS-Magic-Crack-Filler.pdf.†
Logical Resource, Inc. (Applicant), Magic Crack Filler Technical Data Sheet, 1 Page, May 10, 2016, https://logicalresource.net/wp-content/uploads/2019/04/MCF-new-data-sheet-5-10-16.pdf.†
Logical Resource, Inc. (Applicant), Magic Crack Filler Three-Step Instructional Video, 7 pages, Apr. 8, 2016, https://www.youtube.com/watch?app=desktop&v=S0o7LO-epYc.†
Mansur et al., Characterization of Copolymers Poly(ethylene-co-vinyl acetate) and Evaluation of Their Effects in the Modified Mortars Properties, 10 Pages, Feb. 2008, Qualicer.†

\* cited by examiner
† cited by third party

*Primary Examiner* — Anthony J Green
(74) *Attorney, Agent, or Firm* — Dickinson Wright RLLP

(57) ABSTRACT

Disclosed herein are concrete and asphalt crack filler compounds and methods for utilizing them. According to some embodiments, the crack filler compounds can include (1) silica sand, (2) ethylene vinyl acetate, (3) and cement, and/or (4) color additives. According to some embodiments, a method of utilizing one of the compounds can include the steps of (1) obtaining a surface crack filler compound, (2) depositing the surface crack filler compound into a surface crack (e.g., concrete, asphalt, etc.), and (3) depositing water onto the surface crack filler compound to cause the surface crack filler compound to solidify and fill the surface crack. Additionally, and according to some embodiments, the method can further include, prior to depositing the surface crack filler compound into the surface crack: removing debris from the surface crack using at least one of a brush, pressurized air, or pressurized water.

4 Claims, 5 Drawing Sheets

SURFACE CRACK FILLER COMPOUND

CROSS-REFERENCE TO RELATED APPLICATIONS

The present application claims the benefit of U.S. Provisional Application No. 62/794,522, entitled "CONCRETE CRACK FILLER COMPOUND," filed Jan. 18, 2019, the content of which is incorporated herein by reference in its entirety for all purposes.

FIELD OF INVENTION

The described embodiments relate generally to a solution for filling cracks that commonly form throughout surface installations (e.g., concrete and asphalt). More specifically, the described embodiments relate to a surface crack filler compound that, when deposited within a surface crack—and subsequently activated with water—solidifies and thereby fills the surface crack.

BACKGROUND

Concrete and asphalt are commonly used to form durable surfaces that are useful to homeowners, businesses, and the like. Examples of surfaces include driveways, patios, sidewalks, and so on. Although concrete and asphalt are highly durable materials, most installations are still susceptible to situations that cause cracks to be introduced that are aesthetically displeasing. Such cracks can form, for example, in surface installations disposed in environments where extreme variations in temperature, humidity, etc., occur between day and night, thereby causing the surface to expand and contract and form cracks. Other contributing factors include the lack of an internal structure within a given surface installation, voids resulting from uneven ground under the surface, and so on, thereby exhibiting uneven pressure on the surface and causing cracks to form.

It is impractical to cut out and replace areas of surfaces in which cracks have formed as this is an intensive and expensive process. Accordingly, what is needed is an efficient and low-cost approach for filling cracks that commonly form throughout surface installations.

SUMMARY

Representative embodiments described herein set forth a method for filling a concrete crack that has formed in a concrete installation. According to some embodiments, the method can include the steps of (1) obtaining a concrete crack filler compound, (2) depositing the concrete crack filler compound into the concrete crack, and (3) depositing water onto the concrete crack filler compound to cause the concrete crack filler compound to solidify and fill the concrete crack. Additionally, and according to some embodiments, the method can further include, prior to depositing the concrete crack filler compound into the concrete crack: removing debris from the concrete crack using at least one of a brush, pressurized air, or pressurized water.

According to some embodiments, the concrete crack filler compound can be composed of (1) silica sand, (2) ethylene vinyl acetate, and (3) cement. According to some embodiments, ratios of the silica sand, the ethylene vinyl acetate, and the cement in the concrete crack filler compound can range from: 84% to 97% silica sand, 2% to 10% ethylene vinyl acetate, and 1% to 6% cement. Additionally, and according to some embodiments, the silica sand can be sized in accordance with any grit rating.

Representative embodiments described herein also set forth a method for filling an asphalt crack that has formed in an asphalt installation. According to some embodiments, the method can include the steps of (1) obtaining an asphalt crack filler compound, (2) depositing the asphalt crack filler compound into the asphalt crack, and (3) depositing water onto the asphalt crack filler compound to cause the asphalt crack filler compound to solidify and fill the asphalt crack. Additionally, and according to some embodiments, the method can further include, prior to depositing the asphalt crack filler compound into the asphalt crack: removing debris from the asphalt crack using at least one of a brush, pressurized air, or pressurized water.

According to some embodiments, an asphalt crack filler compound designed for asphalt cracks can be composed of (1) black silica sand, (2) ethylene vinyl acetate, (3) cement, and (4) black color cement additive. According to some embodiments, ratios of the black silica sand, the ethylene vinyl acetate, the cement, and the black color cement additive in the asphalt crack filler compound can range from: 84% to 97% silica sand, 2% to 10% ethylene vinyl acetate, 2% to 12% cement, and 0.5%-1% black color cement additive. Additionally, and according to some embodiments, the silica sand can be sized in accordance with any grit rating.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Representative applications of methods and an apparatus according to the presently described embodiments are provided in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Figure 1:
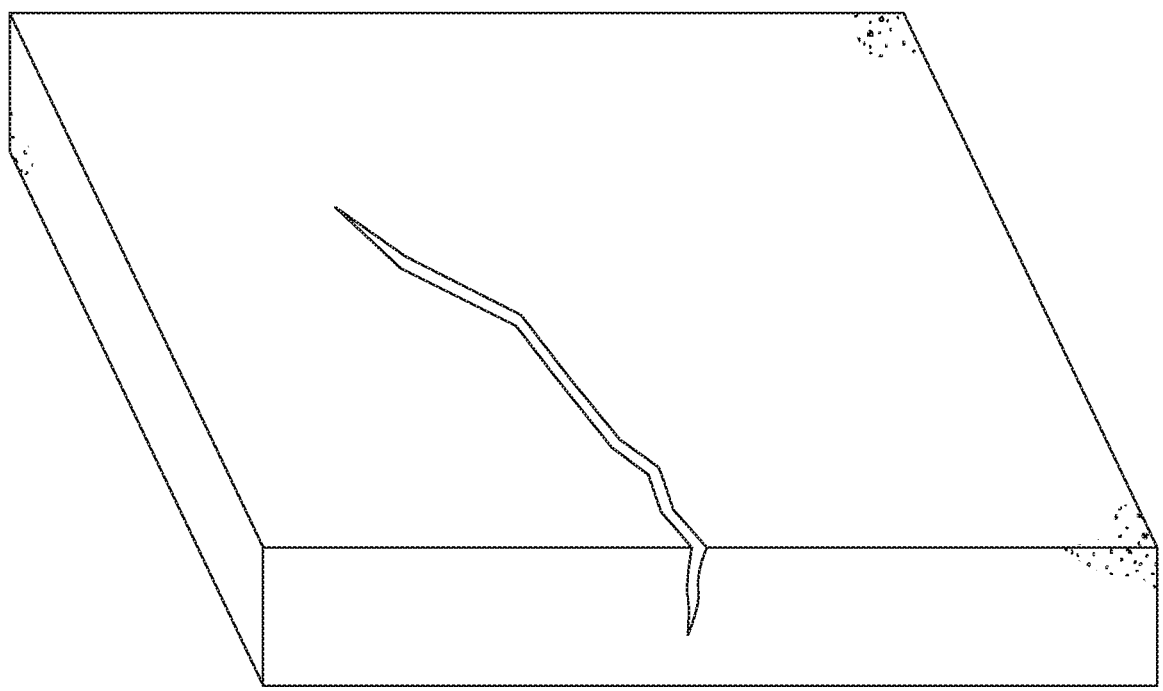
FIG. 1 illustrates a conceptual diagram of a concrete crack that can be filled in accordance with the techniques set forth herein, according to some embodiments.

FIG. 1 illustrates a conceptual diagram of a concrete crack that can be filled in accordance with the techniques set forth herein, according to some embodiments. As shown in FIG. 1, the concrete crack can vary in direction, width, and depth. Although only a single type of concrete crack is illustrated in FIG. 1, it is noted that the concrete crack filler compound described herein can be utilized to mitigate any type of crack, including shrinkage cracks, crazing cracks, settlement cracks, offset cracks, diagonal corner cracks, D-cracks, weathering cracks, and so on. It is noted that the foregoing examples of concrete cracks are not meant to represent an exhaustive list of the types of concrete cracks to which the concrete crack filler compound described herein can be applied. On the contrary, the concrete crack filler compound can be applied to any concrete crack, resulting from any phenomenon, without departing from the scope of this disclosure.

Figure 2:
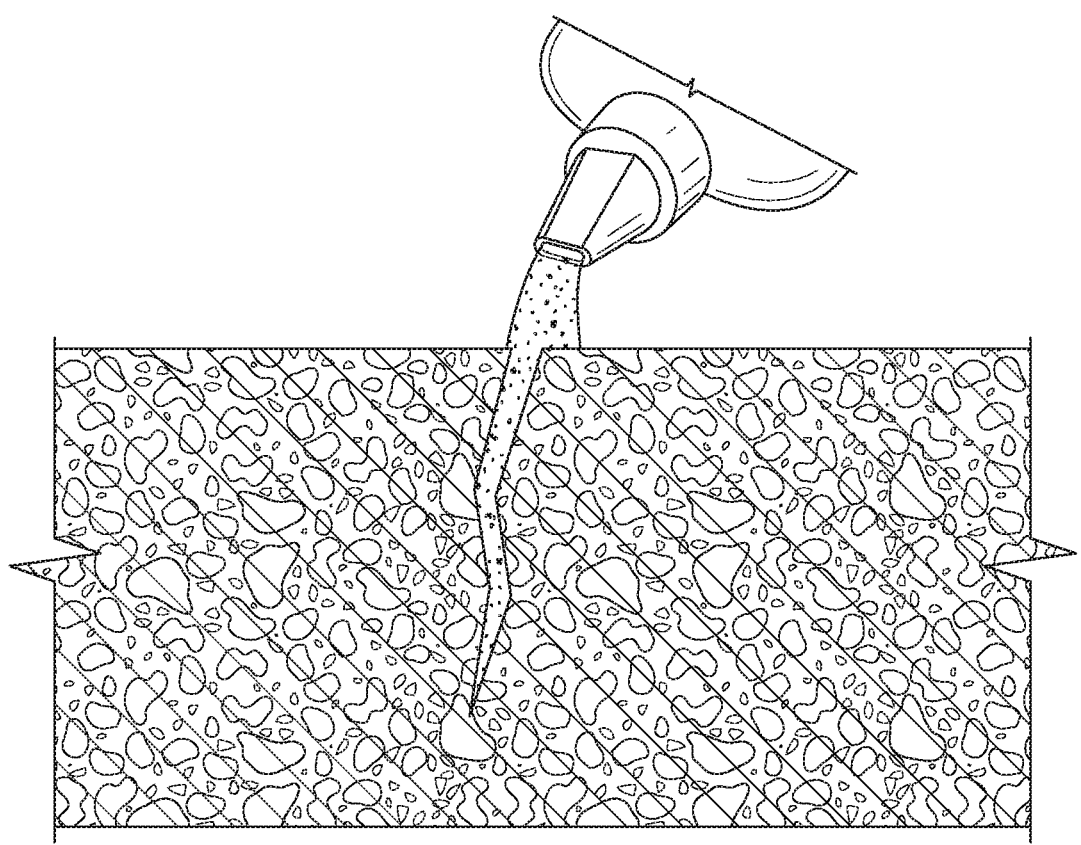
FIG. 2 illustrates a conceptual diagram in which a concrete crack filler compound is deposited into the concrete crack, according to some embodiments.

FIG. 2 illustrates a conceptual diagram in which a concrete crack filler compound is deposited into the concrete crack of FIG. 1, according to some embodiments. Although not illustrated in FIGS. 1-2, it is noted that an initial step of cleaning debris out of the concrete crack can be carried out to improve the overall effectiveness of the concrete crack filler compound. For example, a brush, air blasting (which can include granulated materials to provide abrasion), water blasting (which can also include granulated materials to provide abrasion), etc., can be used to remove debris from the concrete crack. Of note, pressurized water—while effective in removing debris from the concrete crack—can cause residual moisture to persist within the concrete crack. In this regard, use of this method can require a subsequent delay to ensure that the concrete crack is completely dry, given the concrete crack filler compound is water-activated and should not come into contact with moisture when the concrete crack filler compound is initially deposited into the concrete crack.

In any case, when the concrete crack is clean and dry, the concrete crack is ready to receive a deposit of the concrete crack filler compound. According to some embodiments, the concrete crack filler compound can be composed of silica sand, ethylene vinyl acetate, and cement. It is noted that the term "cement" used herein can represent any known form of cement, including, but not limited to, ordinary Portland cement, Portland pozzolana cement, rapid hardening cement, quick setting cement, low heat cement, sulphates resisting cement, blast furnace slag cement, high alumina cement, white cement, colored cement, air entraining cement, expansive cement, hydrographic cement, hydraulic cement, liquified cement, and so on. It is noted that the foregoing examples of cement is not intended to represent an exhaustive list, and that any form of cement can be incorporated into the concrete crack filler compound without departing from the scope of this disclosure.

According to some embodiments, the concrete crack filler compound can be composed of 84% to 97% silica sand, 2% to 10% ethylene vinyl acetate, and 1% to 6% cement. It is noted that the foregoing ratios are exemplary and not meant to be limiting in any fashion. On the contrary, the ratios can be modified in any manner without departing from the scope of this disclosure. For example, higher concentrations of ethylene vinyl acetate can increase the overall flexibility of the concrete crack filler compound after it has cured, which can improve the overall lifespan of the concrete crack repair that is achieved using the concrete crack filler compound. However, too high a concentration of ethylene vinyl acetate can compromise its ability to blend with the silica sand, so tradeoffs should be considered. Additionally, it is noted that varying grits of silica sand can be utilized depending on the texture of the concrete in which the concrete crack has formed. For example, a lower-grit silica sand (e.g., forty grit) can be utilized when the concrete has a rough texture, whereas a higher-grit silica sand (e.g., ninety grit) can be utilized when the concrete crack has a smooth texture. It is noted that the foregoing grits are exemplary and not meant to be limiting in any fashion. On the contrary, the silica sand can be of any grit size without departing from the scope of this disclosure.

Additionally, it is noted that other ingredients can be added to the concrete crack filler compound without departing from the scope of this disclosure. For example, one or more dyes can be added to the concrete crack filler compound in the interest of matching different shades of concrete to which the concrete crack filler compound can be applied.

As shown in FIG. 2, the concrete crack filler compound can be deposited into the concrete crack such that the concrete crack filler compound substantially fills the concrete crack. According to some embodiments, and as shown in FIG. 2, the concrete crack filler compound can be housed in a bottle with a tip that enables the concrete crack filler compound to be deposited into the concrete crack in a targeted manner. It is noted that the bottle and type designs illustrated in FIG. 2 are exemplary, and that any housing for storing—and any method for depositing—the concrete crack filler compound can be utilized without departing from the scope of this disclosure. In any case, the concrete crack filler compound can be appropriately deposited throughout the concrete crack such that the concrete crack is substantially filled with the concrete crack filler compound.

Figure 3:
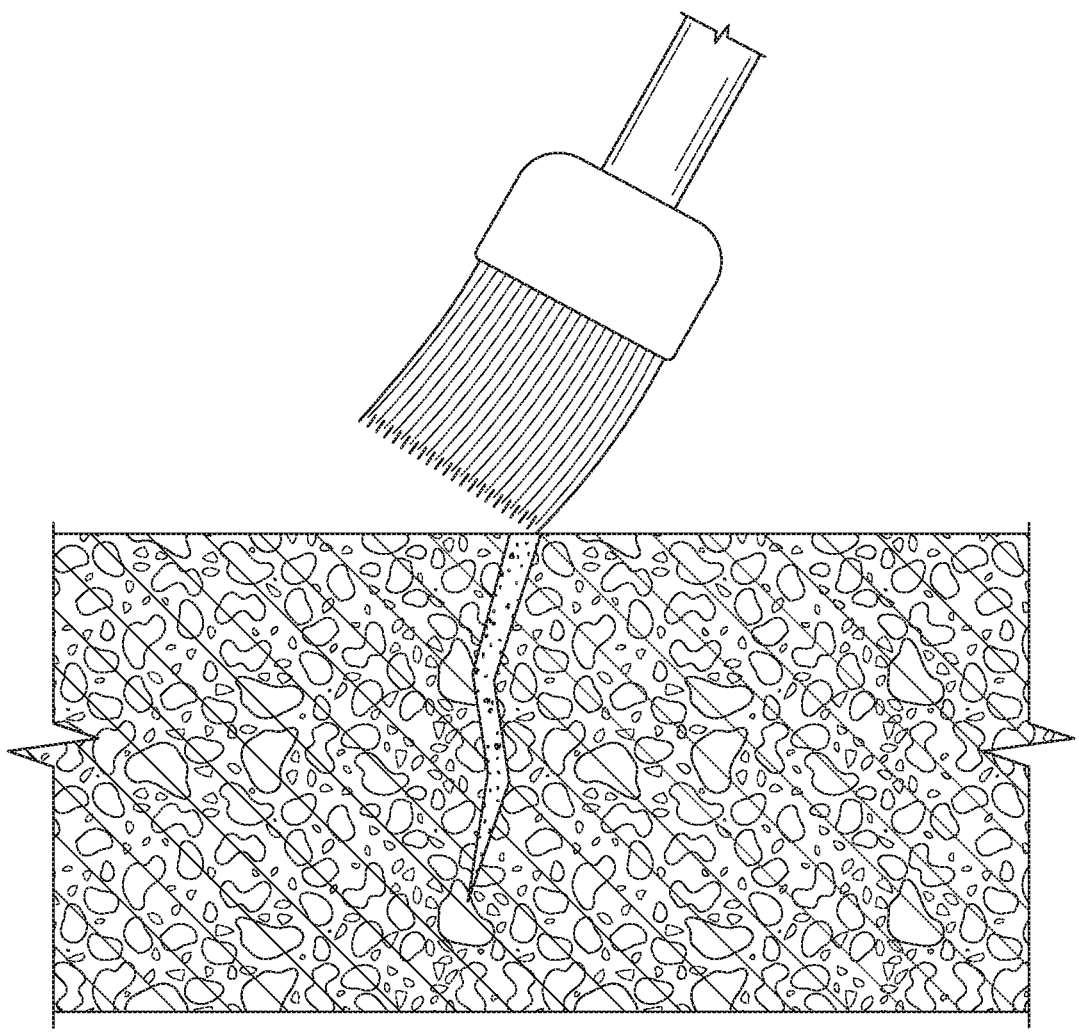
FIG. 3 illustrates a conceptual diagram in which excess amounts of the concrete crack filler compound that are not deposited into the concrete crack are cleaned away, according to some embodiments.

FIG. 3 illustrates a conceptual diagram in which excess amounts of the concrete crack filler compound that are not deposited into the concrete crack are optionally cleaned away, according to some embodiments. As shown in FIG. 3, a brush (e.g., one with fine bristles) can be used to clean away any excess concrete crack filler compound that was not effectively deposited into the concrete crack. It is noted that the brush can also assist in lightly packing the concrete crack filler compound into the crack to increase the overall density of the concrete crack filler compound within the concrete crack. However, it is noted that care should be taken to ensure that the brush does not cause the level of concrete crack filler compound to fall below the surface of the concrete, as this shortfall might compromise the ability of the concrete crack filler compound to fill the concrete crack when activated with water. It is noted that the brush illustrated in FIG. 3 represents only one approach that can be used to distribute and/or remove excess amounts of the concrete crack filler compound and is thus not meant to be limiting. On the contrary, other approaches can be utilized, including regular brooms, push brooms, pressurized air (e.g., on a low setting to avoid blasting the concrete crack filler compound out of the concrete crack), and so on.

Figure 4:
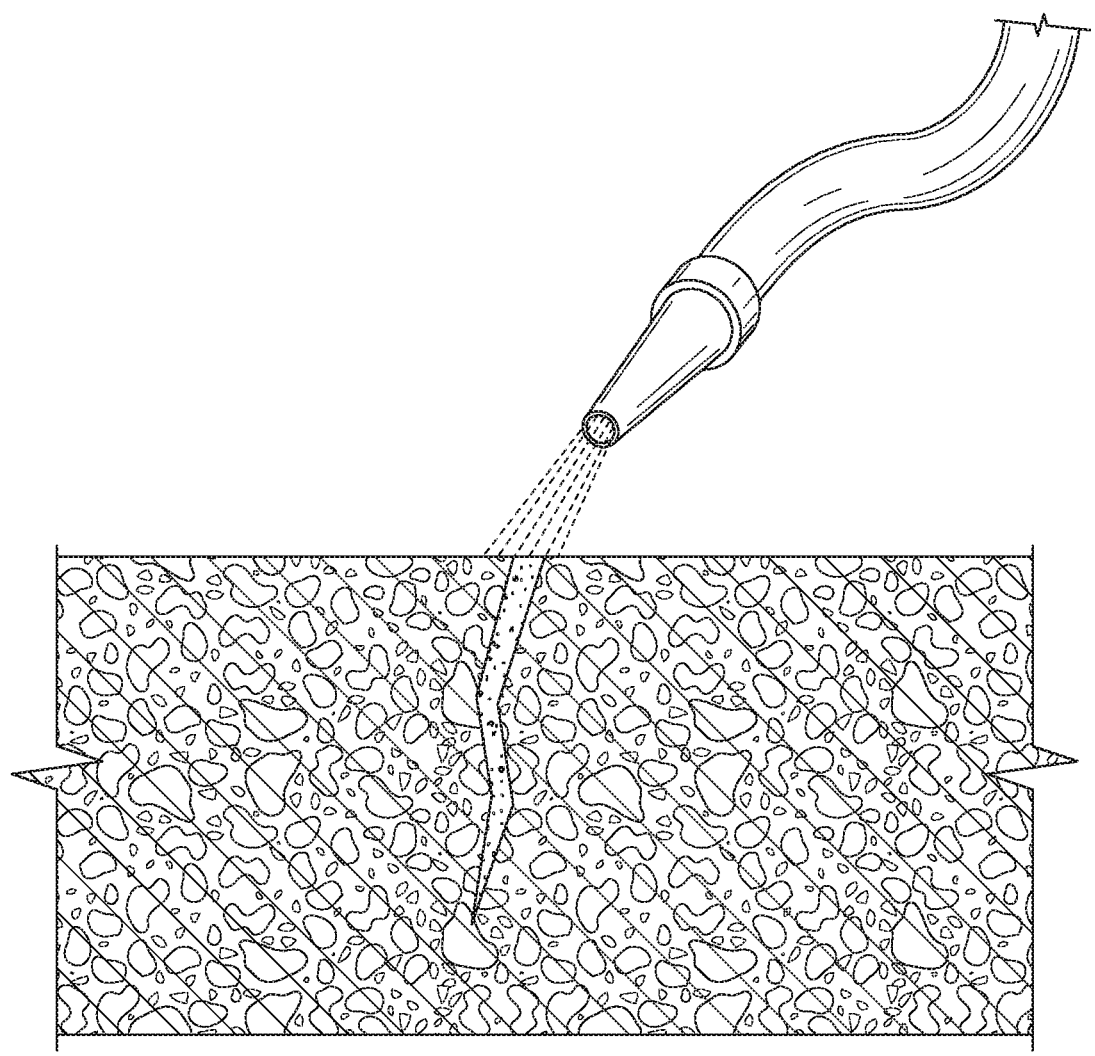
FIG. 4 illustrates a conceptual diagram in which water is deposited over the concrete crack filler compound to activate its function and cause it to fill the crack, according to some embodiments.

FIG. 4 illustrates a conceptual diagram in which water is deposited over the concrete crack filler compound to activate its function and cause it to fill the crack, according to some embodiments. As shown in FIG. 4, the water can be deposited onto the concrete crack filler compound using a mister, a sprayer, etc., to avoid disturbing the integrity of the concrete crack filler compound, which might otherwise by caused by using a higher pressure water flow (e.g., a common garden hose spout). However, a common garden hose spout can be used to spray water onto an area of the concrete that is nearby the concrete crack, with the intent of causing a gentle stream of water to flow over to the concrete crack and come into contact with the concrete crack filler compound without disturbing its integrity.

In any case, any technique of depositing water can be used, with the goal of moistening the concrete crack filler compound without disturbing its integrity within the concrete crack. It is noted that the composition of the concrete crack filler compound makes it such that it only needs to be dampened in order to activate. In this regard, it can be beneficial to apply the water sparingly, which can also help avoid inadvertently washing the concrete crack filler compound out of the concrete crack. Additionally, it is noted that using warmer water can improve the performance of the concrete crack filler compound, as warmer water evaporates at a faster rate and thus cures the concrete crack filler compound in less time. Thus, specific water temperatures are not required to activate the concrete crack filler compound but can influence the manner in which it cures.

Figure 5:
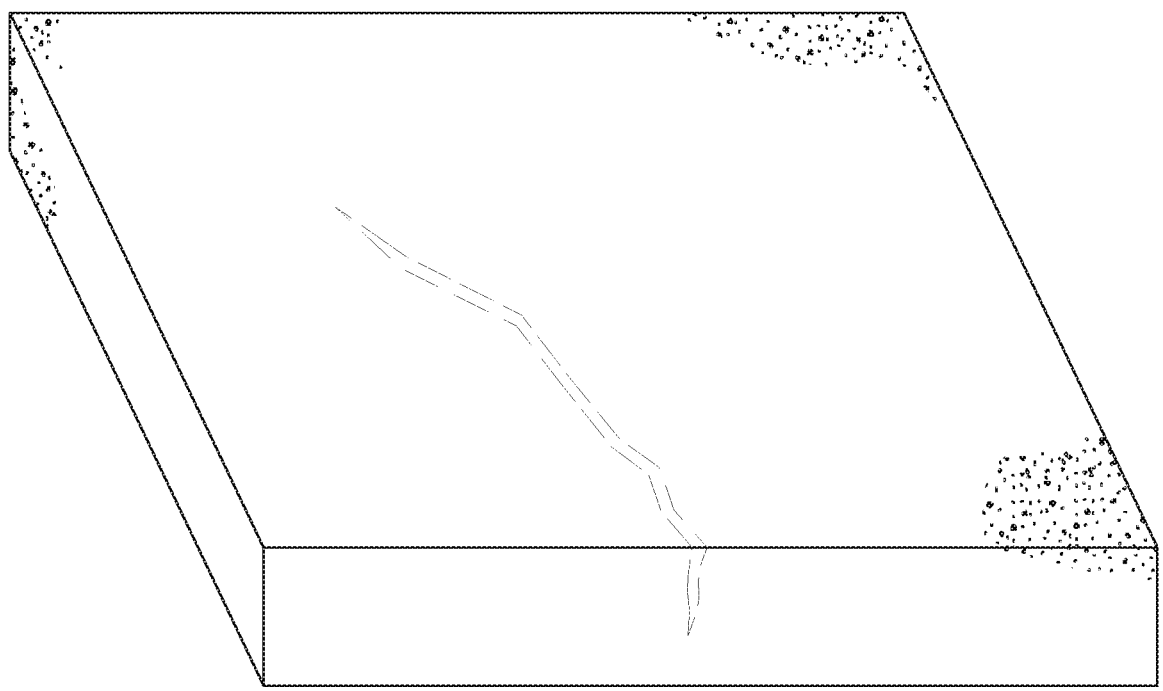
FIG. 5 illustrates a conceptual diagram in which the concrete crack filler compound is dried and substantially causes the concrete crack to virtually disappear, according to some embodiments.

FIG. 5 illustrates a conceptual diagram in which the concrete crack filler compound is dried and substantially causes the concrete crack to be filled such that it virtually disappears, according to some embodiments. In particular, FIG. 5 represents the state of the concrete crack filler compound after it has been activated by water and given time to dry, thus causing the concrete crack filler compound to solidify and fill the concrete crack. Although the concrete crack is still illustrated in FIG. 5, it is noted that the broken lines are meant to indicate that the concrete crack previously existed in that area, such that the concrete crack has substantially been filled after the application and curing of the concrete crack filler compound.

Additionally, it is noted that while FIGS. 1-5 generally discuss filling concrete cracks with the concrete crack filler compound disclosed herein, this disclosure also contemplates an asphalt crack filler compound that can be used to fill asphalt cracks in a similar manner. In particular, and according to some embodiments, the asphalt crack filler compound can be composed of (1) black silica sand, (2) ethylene vinyl acetate, (3) cement, and (4) black color cement additive. The black silica sand and the black color cement additive can function to cause the asphalt crack filler compound to closely match the color of the asphalt. According to some embodiments, ratios of the black silica sand, the ethylene vinyl acetate, the cement, and the black color cement additive in the asphalt crack filler compound can range from: 84% to 97% silica sand, 2% to 10% ethylene vinyl acetate, 2% to 12% cement, and 0.5%-1% black color cement additive. Additionally, and according to some embodiments, the silica sand can be sized in accordance with any grit rating.

Additionally, it is noted that the ratios set forth herein relating to the disclosed cement and asphalt crack filler compounds are merely exemplary, and that any ratios can be employed without departing from the scope of this disclosure. It is additionally noted that the disclosed cement and asphalt crack filler compounds are not limited to the elements described herein of which they are composed. In particular, one or more of the elements can be removed or modified without departing from the scope of this disclosure. Additionally, it is noted that additional elements can be incorporated into the cement and asphalt crack filler compounds without departing from this disclosure.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

We claim:

1. An asphalt crack filler compound, composed of:
   black silica sand;
   ethylene vinyl acetate;
   cement; and
   black color cement additive.

2. The asphalt crack filler compound of claim 1, wherein ratios of the black silica sand, the ethylene vinyl acetate, the cement, and the black color cement additive in the asphalt crack filler compound range from:
   84% to 97% black silica sand;
   2% to 10% ethylene vinyl acetate;
   2% to 12% cement; and
   0.5% to 1% black color cement additive.

3. The asphalt crack filler compound of claim 1, wherein the black silica sand is sized in accordance with a ninety grit rating.

4. The asphalt crack filler compound of claim 1, wherein the asphalt crack filler compound, when deposited into an asphalt crack and activated with water, solidifies and fills the asphalt crack.

* * * * *